June 10, 1930.  S. A. STAEGE  1,763,272
REGULATOR SYSTEM
Filed Oct. 14, 1924  2 Sheets-Sheet 2

WITNESSES:
G. S. Neilson
J. E. Hardy

INVENTOR
Stephen A. Staege
BY
Wesley G. Carr
ATTORNEY

Patented June 10, 1930

1,763,272

UNITED STATES PATENT OFFICE

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA

REGULATOR SYSTEM

Application filed October 14, 1924. Serial No. 743,578.

My invention relates to regulator systems for establishing and automatically maintaining a desired speed relation between the sectional driving motors for the separate units of a machine, such as a paper-making machine or the like.

In paper-making machines, the raw material or stock is supplied to what is known as the "wet end" of the machine, where it is collected by suitable devices into a thin sheet in a moistened state. This sheet is conveyed to the succeeding sections of the machine through the couch rolls, press rolls, dryer rolls and calender rolls and, finally, the reel. In this operation, part of the moisture is pressed out of the wet sheet and part of it is dried out; the sheet receives a smooth surface and is wound upon the reel. It will be seen that it is necessary to drive the several parts of the machine at the proper speeds in order to prevent the sheet from breaking or sagging between adjacent rolls.

As the paper passes through the different sections of the machine, it stretches or contracts, in accordance with the effects produced by the presses, dryers, and calenders, as well as the effect of atmospheric conditions and the characteristics of the stock as it goes through the machine and, consequently, each part of the machine must be driven at a slightly different speed from the adjacent parts or sections. The particular speed ratio required to be maintained between the several paper-mill sections or sets of rolls varies with different grades of paper product and also on account of the above-mentioned variable factors. It is also necessary that the machine, when once adjusted for a particular speed ratio between the several parts, shall hold the fixed relations of the rolls to each other.

One object of my invention is the provision of a simple and effective regulator system in which the speed of each of the separate section-driving motors of the machine may be independently adjusted while the motors are operating, and the adjustment thus established be automatically maintained.

Another object of my invention is to provide a regulator of the above-indicated character, which will regulate the section-driving motors to maintain a constant speed ratio with respect to a master speed-reference means, and in which the regulating effect will be cumulative.

Another object of my invention is to provide a regulating system wherein the regulator automatically assumes the full-field position when the section motor is being started, and then automatically weakens the field flux to maintain the proper speed relation as the motor approaches its normal operating speed.

A further object of my invention is to provide regulators which permit of different rates of regulation for the several section motors, thereby serving to increase the working range of the regulator system and to best accommodate the different section characteristics.

In my regulator system, the regulation is effected by varying the resistance of the shunt field-winding circuits of direct-current motors. The effective value of the resistor that is in the circuit depends upon the angular position, or phase displacement, between the motor being controlled and the master motor, or speed-reference means, with which the speed of the controlled motor is being compared.

A rotary contactor is provided that is differentially responsive to the speed of the master motor and to the speed of the controlled motor. This rotary contactor comprises a drum having conducting and non-conducting segments. The conducting segment is tapered in form and the drum is arranged to be moved endwise so that the width of the conducting segment rotating beneath brushes, which are arranged around the periphery of the drum, varies for each longitudinal position of the drum. At one extreme end of the drum, the conducting segment extends throughout its entire circumference, and the brushes are in contact with the conducting segment throughout the entire rotative movement, while, at the other extreme end of the drum, the brushes do not make contact with the conducting segment. The conducting segments and the cooperating brushes periodically short-circuit resistance units that are connected in series relation with the shunt field-winding of the motor being controlled. When the brushes are short-circuited by the conducting segment of the drum, the resistance is short-circuited from the field-winding circuit; and, when the brushes are open-circuited, the resistance is then in circuit with the motor field winding.

The longitudinal movement of the drum is effected by means of a screw-and-nut differential device. The screw member is driven by one member of the differential system, and the nut member is mounted on the above-mentioned drum, or connected to the drum, and driven from the other member of the differential system. When the speed of the motor to be controlled and that of the master or speed-reference means are alike, both the nut and the screw rotate at the same speed, and no longitudinal movement of the drum is produced. If, however, the motor to be controlled varies in speed from that of the master, the drum will then be moved longitudinally in the one or the other direction, according to the amount and direction of speed variation.

A number of arrangements of the parts of the contactor device are possible, involving changes in the shape of the conducting segment, the number of brushes disposed around the periphery of the drum, and the manner in which the resistor units are connected in the circuit. A plurality of brushes may be used, two opposite brushes being placed in series relation with the shunt field-winding circuit of the motor, and the remaining brushes and resistance units being connected between the brushes of each pair to form two parallel circuits.

Another preferred form requires the use of only two brushes rotated at opposite sides of the drum and having the entire set of resistance units connected between them.

A third form is to have the resistor divided into a number of sections or steps, and brushes connected to each of these steps and arranged around the periphery of the contactor drum, the several resistor sections being connected in series-circuit relation with each other. The conducting segment of the rotating drum may be tapered or wedge-shaped. The brushes are connected to make contact with the cylinder to which the wedge-shaped conductor is attached. The longitudinal movement of the drum, while rotating, successively excludes from the motor field-winding circuit the several steps of resistance, the number of steps cut out at any one time being dependent upon the longitudinal position of the drum.

For a given position of the drum with respect to the brushes, certain of the resistor sections will be short-circuited throughout an entire rotative movement of the drum, since the brushes connected to these sections will be continuously on the conducting surface element of the drum. Similarly, certain brushes will be continuously on the non-conducting surface element of the drum, and the resistor sections connected between them will, therefore, be continuously in circuit with the motor field-winding. There will also be a resistor section, or possibly two resistor sections which will be intermittently short-circuited, for a shorter or longer time during each revolution of the drum, depending upon the relative positions of the drum and brushes. It will, therefore, be seen that the device acts as a rotary rheostat, and also as a regulator of the pulsatory type.

My invention will be better understood by reference to the accompanying drawing, in which Fig. 1 represents a diagrammatic view of apparatus organized in accordance with the system of my invention;

Figure 1:
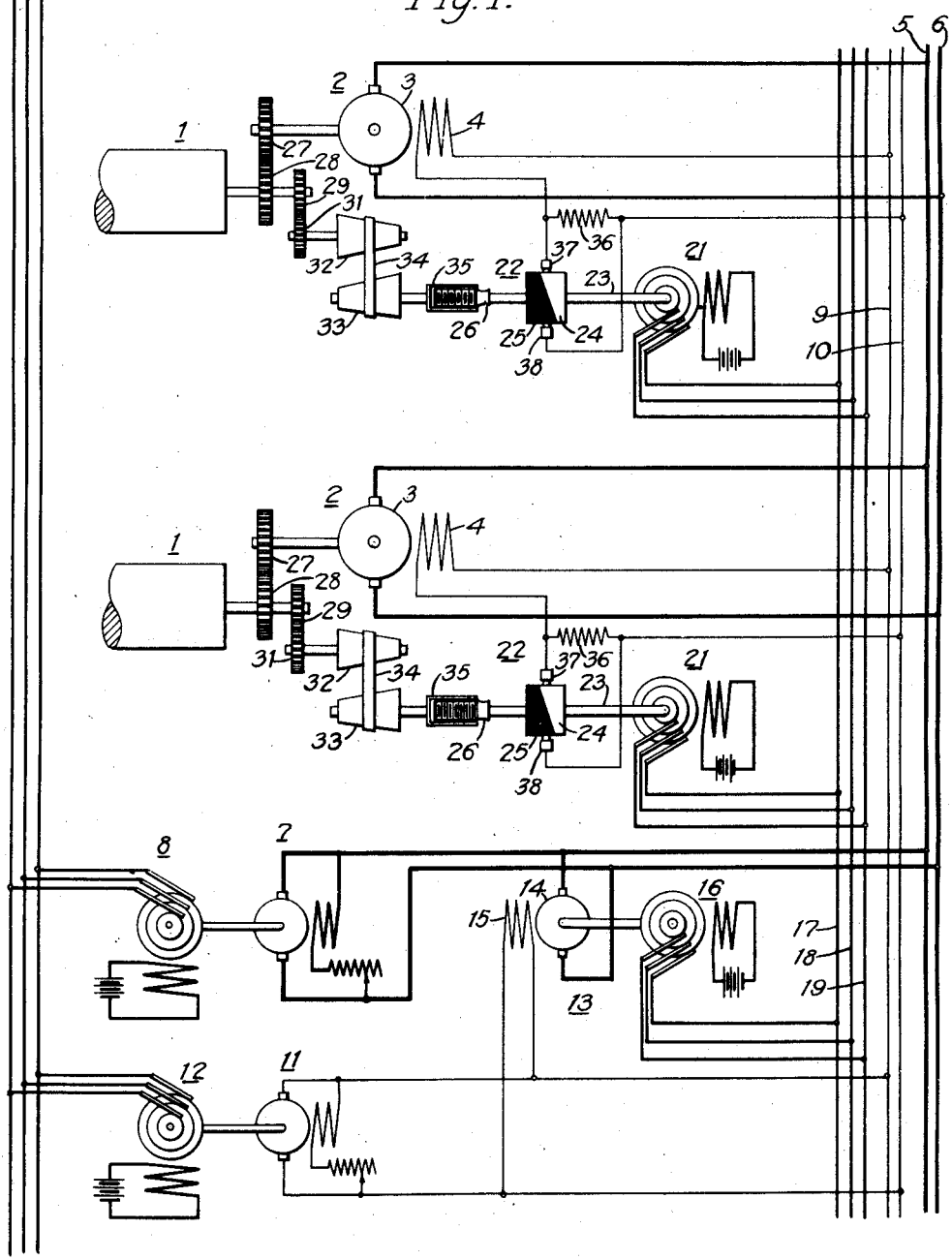

Referring to Fig. 1 of the drawing, two sections of a paper-making machine are illustrated, it being understood that any number of sections may be regulated similarly to the regulation of a single section. A plurality of paper rolls 1 are provided with driving motors 2, respectively having an armature winding 3 and a field winding 4. Each armature winding is connected to an adjustable voltage direct-current supply 5—6, and each field winding circuit is connected to a pair of constant-potential direct-current supply conductors 9—10. The adjustable-voltage supply conductors are supplied with energy from any suitable source, such as a generator 7, driven by a synchronous motor 8. The constant-potential circuit 9—10 may be supplied from a generator 11 driven by a synchronous motor 12.

A direct-current or master motor 13, having an armature winding 14 and a field winding 15, is connected similarly to the section driving motors 2, that is, the motor 13 has its armature supplied with current from the adjustable-voltage source 5—6 and its field winding supplied with current from the constant-voltage source 9—10. The motor 13 drives an alternating-current generator 16, which provides a variable-frequency three-phase current to conductors 17, 18 and 19. Each paper-machine section is provided with an associated synchronous motor 21 that is connected to this variable-frequency source, which motor, in the form of the invention illustrated in Fig. 1, operates the rotary contactor 22 and one end of the differential device 26, by means of the shaft 23.

The rotary contactor is provided with a conducting segment 24 and a non-conducting segment 25. Each section motor 2 is connected, by means of gear-wheels 27 and 28, to its associated roll 1, and also, by means of gear wheels 29 and 31, cone pulleys 32 and 33 and their cooperating belt 34, to one side of the differential device 35. The differential device 35 is illustrated as a screw-threaded nut engaging screw element 26, although these elements may be reversed. A resistor 36 is illustrated as connected in series-circuit relation with the field winding 4. The resistor terminals are connected to brushes 37 and 38, which are associated with the rotating drum of the contactor device.

Figure 2:
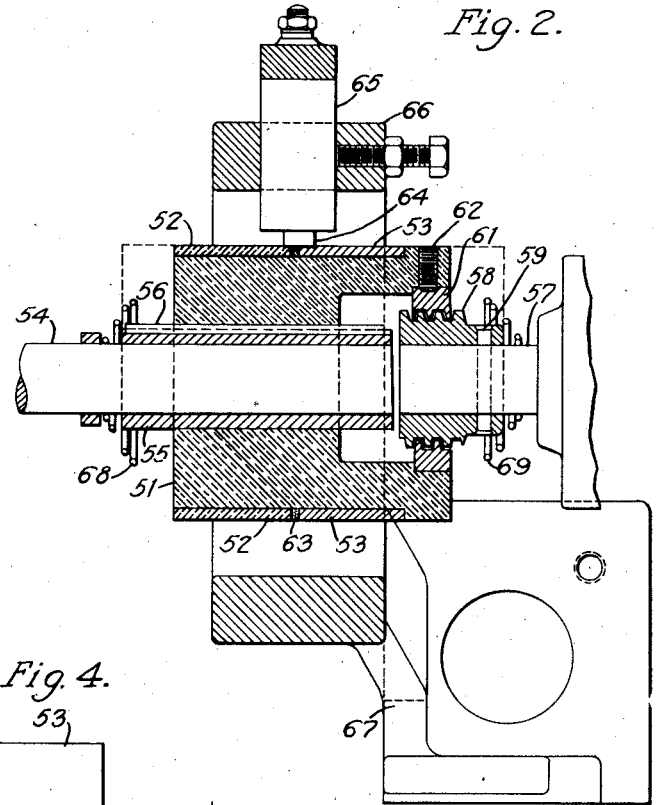
Fig. 2 represents a sectional view of one preferred form of contactor device.

The rotary contactor, illustrated in Fig. 2, comprises a drum 51, having non-conducting and conducting interlinked surface elements 52 and 53, respectively. The drum is attached to one shaft 54 of the differential system by means of a bushing 55 and a spline or key 56, the drum 51 being loosely fitted to be movable axially along the bushing. A space between the conducting and non-conducting surface portions 52 and 53 is provided and is filled with cement 63. To the shaft 57 of the differential system is attached a worm or screw element 58 by means of a pin 59. The worm 58 engages a nut 61, which is attached to the drum 51 by any suitable means, such as a stud 62. A plurality of brushes 64 are disposed about the drum, being mounted in brush holders 65 that are supported by a brush-ring holder 66, which is mounted upon any suitable base 67.

Figure 3:
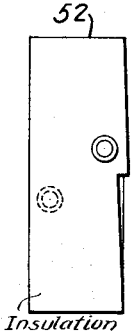
Figs. 3 and 4 illustrate preferred forms of conducting and non-conducting surface elements of the contactor drum.
Figure 4:
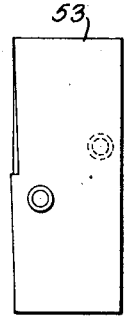

Figs. 3 and 4 illustrate the helicoidal form of symmetrical conducting and non-conducting surface elements 52 and 53 comprising a preferred form of rotary contactor surface that is used in an embodiment of my invention.

Figure 5:
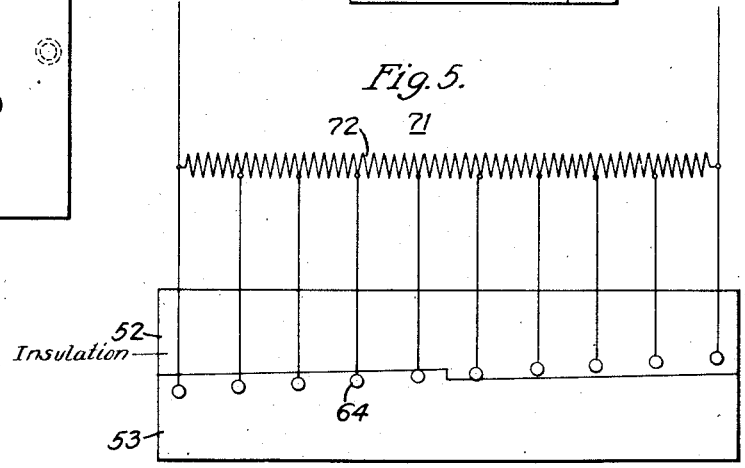
Fig. 5 illustrates a development of the contactor-drum surface, showing one preferred arrangement of connecting the brushes to sections of the field-winding circuit resistor.

Fig. 5 illustrates a development of the cam-shaped conducting and non-conducting segments and also a preferred arrangement of the brushes 64, which are connected to successive sections 72 of the resistor element 71. It will be noted that the brushes 64 are arranged in line at an angle to the direction of motion of the segments 52 and 53. The line of the brushes 64 thus forms a helix as arranged around the periphery of the drum.

The operation of my system is as follows: When it is desired to change the speed of operation of the entire paper machine, this may be done by changing the voltage of the generator 7, thereby changing the energy supply to the motors 2 and also to the master motor 13, which changes the frequency supplied from the generator 16 to the synchronous motors 21. Since the master motor 13 is connected in parallel-circuit relation to the motors 2, a change in the frequency of the current supplied to synchronous motors 21 is substantially proportional to the change in speed of the motors 2, by reason of the equivalent change in the voltage impressed upon the motor armatures. The effective value of the resistor 36 may, therefore, be substantially the same, regardless of the speed at which the system is operated. When it is desired to change the speed of an individual section, this may be done by suitably varying the position of the belt 34 upon the cone pulleys 32 and 33. This variation affects one side of the differential element 35, causing the rotary contactor 22 to vary the effective value of the resistor 36.

Reference may now be made to the operation of my preferred form of rotary contactor, as illustrated in Figs. 2 to 5. As the tapered edge of the rotating copper conductor 53 approaches and passes under the row of brushes, following an axial movement of the contactor drum, it successively short-circuits steps of field-winding-circuit resistance. At first the short-circuit is not continuous for a given step of resistance, but is intermittent, the proportion of time the short-circuit is maintained depending upon the position of the drum with respect to the brushes. The advancing edge of the tapered conductor 53 intermittently short-circuits different steps of resistance, the particular step depending upon the longitudinal position of the drum. Should the position of the drum advance sufficiently, certain steps of resistance will be short-circuited throughout an entire revolution of the drum, while other steps will be intermittently short-circuited.

If it were possible to make the conducting surface of the brushes of no appreciable width, the desirable pitch for the helical edge of the drum conducting segment 53 would be substantially the axial displacement between successive contactor brushes. Inasmuch as it is necessary to make the brush surfaces of appreciable area, it is desirable, in practice, to make the pitch of the conductor edge somewhat greater than the pitch or axial displacement between two adjacent brushes. The conductor pitch should, however, be less than twice the pitch between adjacent brushes so that, for any position of the drum, there will never be more than two steps of resistance intermittently short-circuited.

It will be seen, therefore, that the contactor and resistor segments act as a rotary rheostat for approximate regulation, and as a pulsatory regulator having an infinite number of steps for precise regulation.

When the cylinder is at one extreme end position, the resistor 71 is "all in", while at the other extreme end position, the resistor 71 is "all out" of the field-winding circuit. Because of the intermittent short-circuiting of the resistance steps, an unlimited number of effective resistance values is possible. If the speed of the section motor is correct and does not change, the speed of the nut and of the worm or screw element are alike, and there is no longitudinal motion of the contactor drum. When the section-motor speed changes from its correct value, even by a very slight amount, the drum shifts its position in a direction to correct the change in the section-motor speed. This differential effect is cumulative until the speeds are fully corrected.

Each position of the cylinder, as it moves longitudinally, corresponds to a definite effective value of field-winding-circuit resistance, and the exact amount of resistance needed to retain the section-motor speed is obtained automatically when the correct section-motor speed is reached. If the section-motor speed is too fast, the contactor drum moves endwise in one direction to reduce the field-winding circuit resistance, and, if the speed is too slow, it moves in the other direction to increase this resistance. The extreme endwise positions of the drum 51 are shown in Fig. 2 in dotted lines. Should the motor speed vary sufficiently, as might be the case in stopping the machine, the nut element 61 would run out of engagement with the worm element 58, either to the extreme right or the extreme left. In order to insure re-engagement of the differential elements upon the re-establishment of proper speed relations, coil-spring elements 68 and 69 are provided, which engage the end of the drum 51 in its extreme left and in its extreme right position, respectively, and bias it toward its middle or normal position, so that the screw threads of the differential device will be forced into engagement.

It will be noted that the elements 58 and 61, forming the worm-and-nut elements of the differential, are removable. It is sometimes desirable to change the speed at which the drum will move longitudinally with respect to a given rate of motor-speed change and this may easily be done by using a different screw-thread pitch for the screw-and-nut elements of the differential. It is especially desirable to provide differential elements having a different rate of operation for the different section-motor drives, so that each motor may be operating near the middle value of the resistor for its normal speed. This increases the range of the entire system, since that range is not then limited by the range of an individual motor.

There are several ways of varying the quickness of operation of the regulator. One of these, as described above, is by changing the pitch of the differential screw, causing the regulator to change the resistance values at a different rate. The rate at which regulation takes place may also be varied by varying the angle of the conducting segment of the drum or by varying the rate of speed at which the screw and nut are rotated. The result of any of these changes is to vary the amount of resistance "cut in" or "cut out" by a given variation in speed between the master and the controlled motor.

By the use of a large number of resistor steps, it is possible to increase the working range of the regulator without running into trouble as regards sparking on account of too high voltage between brushes. Much less hand adjustment of the field resistor 71 is, therefore, required to keep the regulator within its running range. It will be noted that, in the extreme position of the contactor element, there are no cyclic variations of resistance, as is the case in prior forms of speed regulators, when the speed of the section motor is out of step with the speed of the master motor. It is very desirable that this should be the case, since, in starting the motor, and when abnormal conditions cause the regulator to go beyond its normal working range, it will automatically come back to its proper position without seriously disturbing the speed relations. It is, therefore, safe to work the regulator substantially to the end of its range and it is unnecessary to provide mechanical means to prevent the regulator from pulling out of step. When the section motor is being started, the regulator automatically assumes the "full-field" position, and gradually varies this position as normal speed is approached. When the machine is shut down, the master motor stops more quickly than the section motors, because of the smaller inertia. This causes the brushes to travel to one end of the drum, since the differential device tends to produce a full field on the section motors when they run at a higher rate of speed than that of the master motor.

It will be apparent, from examination of the system described, that both the motor to be controlled and the speed-reference means with which it is compared must operate indefinitely at the same number of revolutions per minute. When load is thrown on the controlled direct-current motor, this increased load will cause the motor to lag slightly behind the speed of the master motor, causing the differential device to adjust the field resistor so that the motor can carry its increased torque without changing its speed, while, in case the load is reduced upon the controlled motor, its phase relation with respect to the master motor is advanced until the contactor drum assumes a position changing the effective field resistance to the proper amount to maintain the motor in synchronism with the master motor. It will be seen, therefore, the the direct-current motor, which is regulated in accordance with the differentially operated contactor device, will have a synchronous motor characteristic. Changes in the load upon the section motors will not change the speed thereof in revolutions per minute but will change merely the phase angle between these motors and the master motor or speed-reference means.

Many modifications and changes in the apparatus and the location of parts herein described as an embodiment may be made within the spirit of my invention, and I do not wish to be limited other than by the scope of the appended claims.

I claim as my invention:

1. In a contactor device, a movable contact member having interlinked helicoidal current-conducting and non-conducting segments, and a plurality of brushes resting upon said contact member and alined at variance with the normal direction of movement of said contact member.

2. In a contactor device, a rotatable member having symmetrically interlinked current-conducting and non-conducting segments, and a plurality of brushes helically disposed about said rotatable member and in contact therewith.

3. In a contactor device, a rotatable member having symmetrically disposed cam-shaped current conducting and non-conducting portions, a plurality of brushes helically disposed about said rotatable member, and means for effecting a relative movement of said brushes and rotatable member, axially thereof.

4. In a contactor device, a rotatable member having symmetrically disposed helicoidal current-conducting and non-conducting surface portions, and a plurality of brushes cooperating therewith helically disposed about said rotatable member.

5. In a regulator, a sectional resistor, means for varying the effective value of said resistor comprising a rotatable member having symmetrically disposed cam-shaped current-conducting and non-conducting surface portions, a plurality of brushes disposed about said rotatable member in contact therewith and connected to the several sections of said resistor, and differential means for effecting a relative movement of said brushes and said rotatable member.

6. In a regulator, a sectional resistor and means for intermittently and successively shunting the several sections of said resistor to gradually vary the effective value thereof, said means comprising a differentially controlled rotatable member having symmetrically disposed cam-shaped current-conducting and non-conducting surface portions, and a plurality of cooperating brushes connected to said resistor sections and making contact with said rotatable member.

7. In a regulator, a sectional resistor and means for intermittently and successively shunting the several sections of said resistor to gradually vary the effective value thereof, said means comprising a differentially controlled rotatable member having symmetrically disposed helicoidal current-conducting and non-conducting surface portions, and a plurality of brushes cooperating therewith helically disposed about said rotatable member.

8. In a regulator, a sectional resistor and means for intermittently and successively shunting the several sections of said resistor to gradually vary the effective value thereof, said means comprising a rotatable contact member having symmetrically disposed cam-shaped current-conducting and non-conducting surface portions, a plurality of brushes engaging said contact member and connected to said resistor sections, and means for varying the position of said contact member comprising a nut member and a cooperating screw member.

9. In a system of motor control, the combination with an electric motor and a separate speed member, of means responsive to speed variations between the motor to be controlled and the speed member for gradually varying the excitation of the controlled motor, said means comprising a rotary element having symmetrically disposed wedge-shaped conducting and non-conducting surface portions, a plurality of brushes cooperating therewith and means differentially responsive to the speed of said speed member and to the speed of said motor for imparting a lateral motion to said rotary member, and additional means for varying the permanent speed relationship between said motor and said speed member.

10. In a system of motor control, the combination with a separate speed member and an electric motor having a field-magnet winding and a sectional resistor connected in circuit therewith, of means responsive to speed variations between the motor to be controlled and the speed member for gradually varying the excitation of the controlled motor, said means comprising a rotary contactor element and brushes cooperating therewith for intermittently shunting sections of said resistor and means differentially responsive to the speed of said speed member and to the speed of said motor for imparting a lateral motion to said rotary member, and additional means for varying the permanent speed relationship between said motor and said speed member.

11. In a contactor device, a rotatable member having current-conducting and non-conducting segments, a plurality of brushes cooperating therewith, and differential means for controlling the position of said rotatable member and comprising helicoidally threaded cooperating elements, said elements being replaceable by similar elements to vary the pitch of said helicoid.

12. In a contactor device, a rotatable member having current-conducting and non-conducting segments, a plurality of brushes cooperating therewith, and means for varying the longitudinal position of said rotatable member comprising cooperating threaded nut-and-screw members, said nut-and-screw members being removable and replaceable by similar elements to provide for the use of elements having different thread pitches.

13. In a regulator system, a resistor element, a plurality of brushes connected to sections of said resistor element, and a rotatable member having an annular conducting segment and an annular non-conducting segment, said brushes being spaced axially with respect to said rotatable member and in contact therewith, the relative position of said brushes and said rotatable member being adjustable to vary the effective value of said resistor.

14. In a regulator system, a resistor element, a plurality of brushes connected to sections of said resistor element, and a rotatable member having an annular conducting segment and an annular non-conducting segment, said brushes being spaced axially with respect to said rotatable member and in contact therewith, the relative position of said brushes and said rotatable member being adjustable to vary the effective value of said resistor, said annular conducting segment being helicoidal in form to intermittently short-circuit one of said resistor sections.

In testimony whereof, I have hereunto subscribed my name this 9th day of October, 1924.

STEPHEN A. STAEGE.